March 12, 1968    D. E. HOUGHTON ET AL    3,372,428
SHELLFISH MEAT PICKING MACHINE FOR A CRAB PROCESSING APPARATUS
Filed March 29, 1966    5 Sheets-Sheet 1

INVENTORS
DANIEL E. HOUGHTON
EMMETT F. DEADY
BY Ernest L. Cohen
Gersten Sadowsky
ATTORNEYS March 12, 1968    D. E. HOUGHTON ETAL    3,372,428
SHELLFISH MEAT PICKING MACHINE FOR A CRAB PROCESSING APPARATUS
Filed March 29, 1966    5 Sheets-Sheet 2

INVENTORS
DANIEL E. HOUGHTON
EMMETT F. DEADY

BY Ernest S. Cohen
Gersten Sadowsky
ATTORNEYS

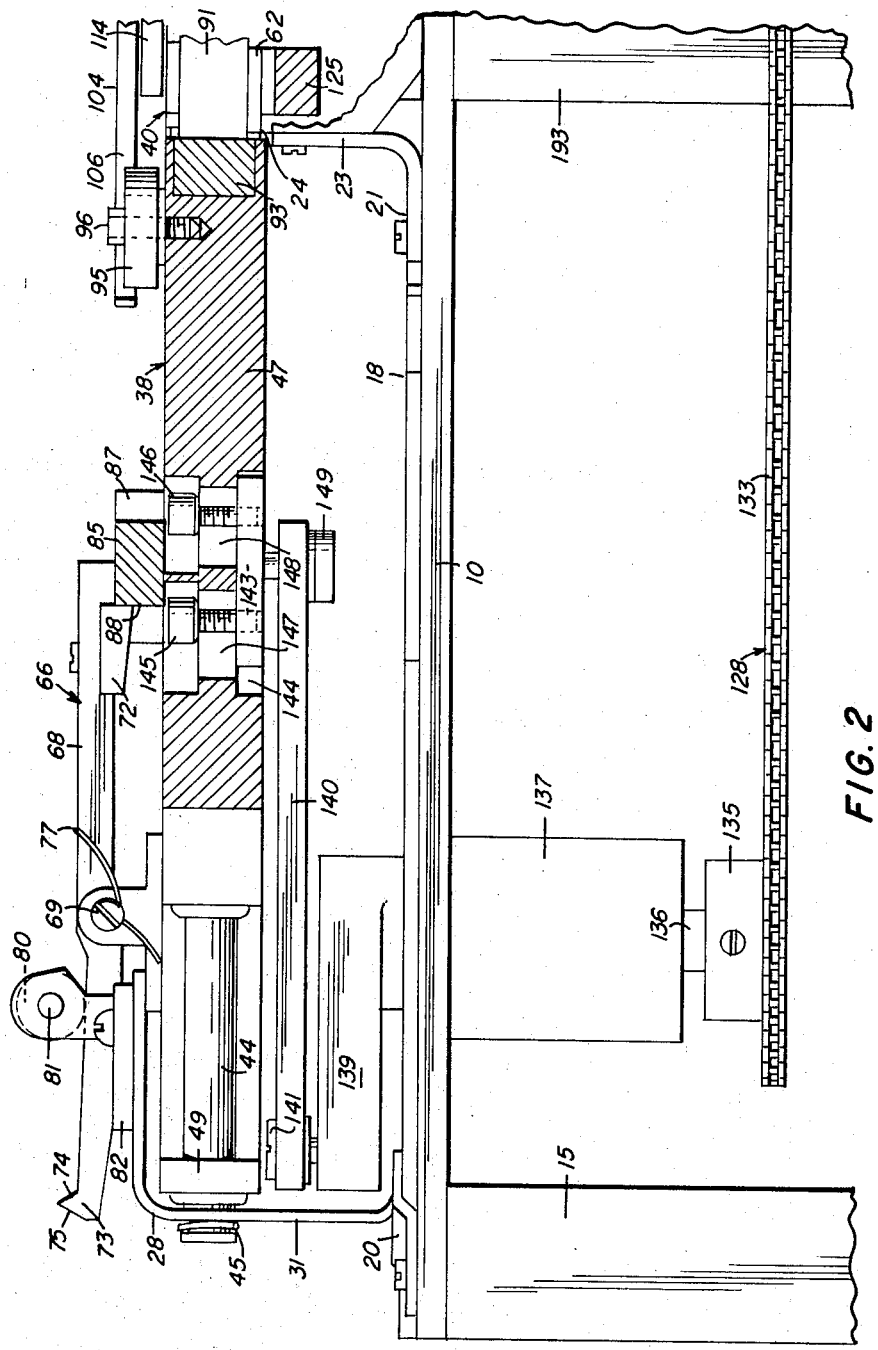

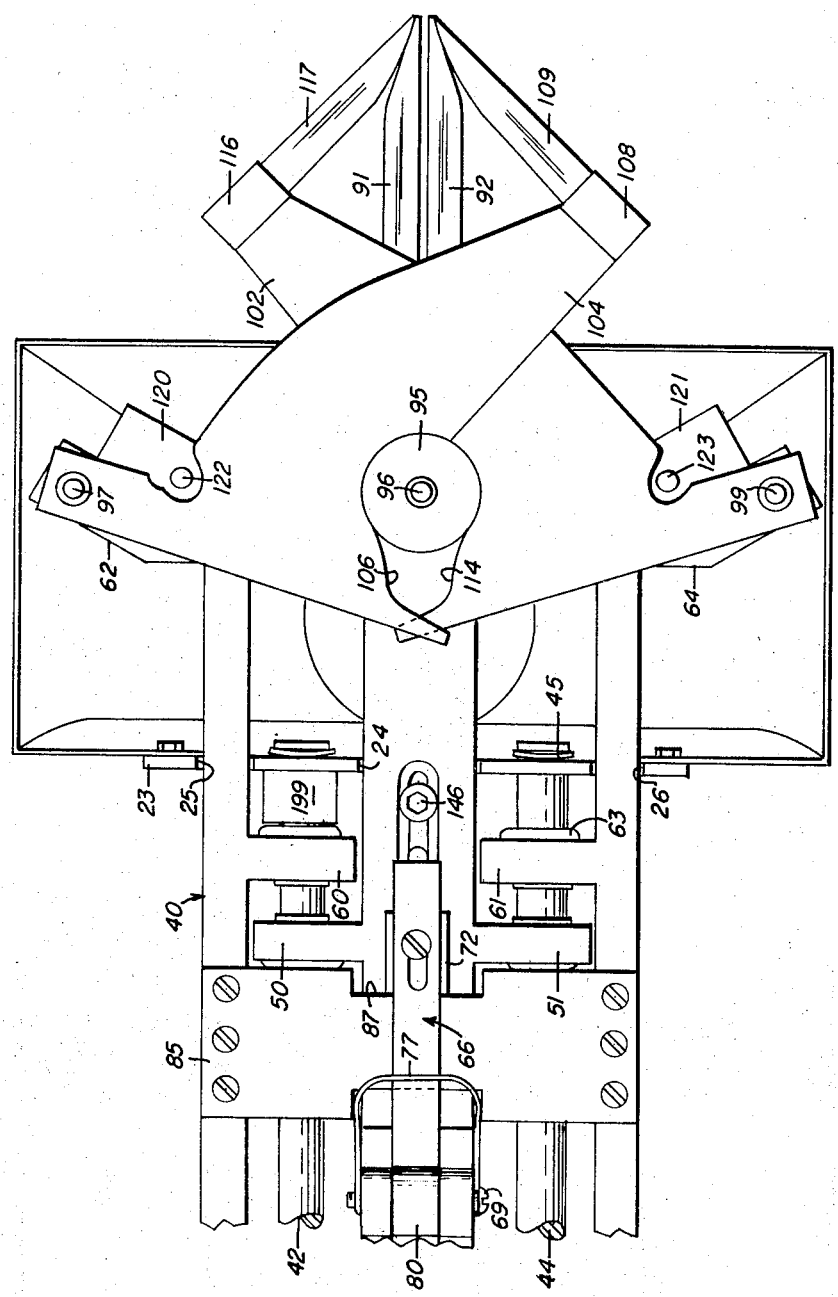

March 12, 1968   D. E. HOUGHTON ETAL   3,372,428
SHELLFISH MEAT PICKING MACHINE FOR A CRAB PROCESSING APPARATUS
Filed March 29, 1966   5 Sheets-Sheet 5

INVENTORS
DANIEL E. HOUGHTON
EMMETT F. DEADY

BY Ernest S. Cohen
Gersten Sadowsky
ATTORNEYS

United States Patent Office 3,372,428
Patented Mar. 12, 1968

3,372,428
SHELLFISH MEAT PICKING MACHINE FOR A
CRAB PROCESSING APPARATUS
Daniel E. Houghton and Emmett F. Deady, Arlington,
Va., assignors to the United States of America as represented by the Secretary of the Interior
Filed Mar. 29, 1966, Ser. No. 538,930
8 Claims. (Cl. 17—2)

ABSTRACT OF THE DISCLOSURE

A machine cyclically synchronized to operate together with a mechanism clamping a crab core in position to be entered by converging gouge-like blades of dual sets which in a continuing movement sever, grip, and withdraw lump meat from the core for disposal thereof by release down a chute upon the blades separating when completing their retraction from the core. A crank driven carriage cooperates with a control slide operating therein which coordinates the disposition of camming elements thereon to direct the blades into the cutting, gripping, withdrawing and releasing actions.

---

This invention relates to a machine for separating meat from shell fish. More particularly the machine is operative on crab cores to pick or extract therefrom their "back-fin" meat in the lump form which is more valuable commercially than other forms of such meat.

In the embodiment of the shellfish meat picking invention described herein, a cyclically operable machine according to the machine is adapted to function in conjunction with a crab coring apparatus wherein previously steamed crabs are suitably cut to make cores thereof that can be automatically debacked, and cleaned by removal of their ventral shells and viscera. An intermittently operative conveyor structure in this crab coring apparatus carries the crab cores singularly in a steady stream to a place in the apparatus whereat each crab is maintained oriented to dispose open back-fin cavities and the meat therein in position to be processed by the picking components of the machine. References are made herein to applicants' copending application Ser. No. 500,456, filed Oct. 21, 1965, wherein a crab coring apparatus is disclosed in detail, for a showing of the structure of the apparatus with which the machine presently described is operatively associated.

The instant machine is equipped with two sets of elongated blades which enter the respective lump cavities of a crab core when the blades of each set are maintained spaced apart such that these blades penetrate into a cavity as they are driven forward to converge and meet at the inner end of a cavity, and are immediately thereafter withdrawn to extract severed "back-fin" meat trapped between the converged blades. A unique camming structure of the machine controls a blade in each set to move in an arcuate path through the crab core cavity to engage a linearly displaceable blade of the set projecting into the cavity. Crank-operated shuttling mechanisms, on which the aforesaid arcuate and linearly movable blades are carried, are intermittently coupled to function in operative association with the camming control to accomplish the blades' penetration into the cavities as well as their withdrawal therefrom without disturbing the blades' positions with respect to each other.

A principal objective of the invention therefore is to provide an automatic machine to pick substantially uniform segments of shellfish meat from processed shellfish placed singularly at the working end of the machine.

A further objective of the invention is to provide for operation in an automatic crab-meat picking machine an arrangement of interacting camming devices which control blade sets severing and extracting crab meat from processed crabs.

These and other objects and advantages of the present invention will become more fully apparent from the following description of the invention set forth herein and from the accompanying drawings made a part hereof in which:

FIG. 2 is a fragmentary elevational showing of the machine in FIGS. 1A and 1B, including a partial section taken along line 2—2 in these figures;

Figure 1A:
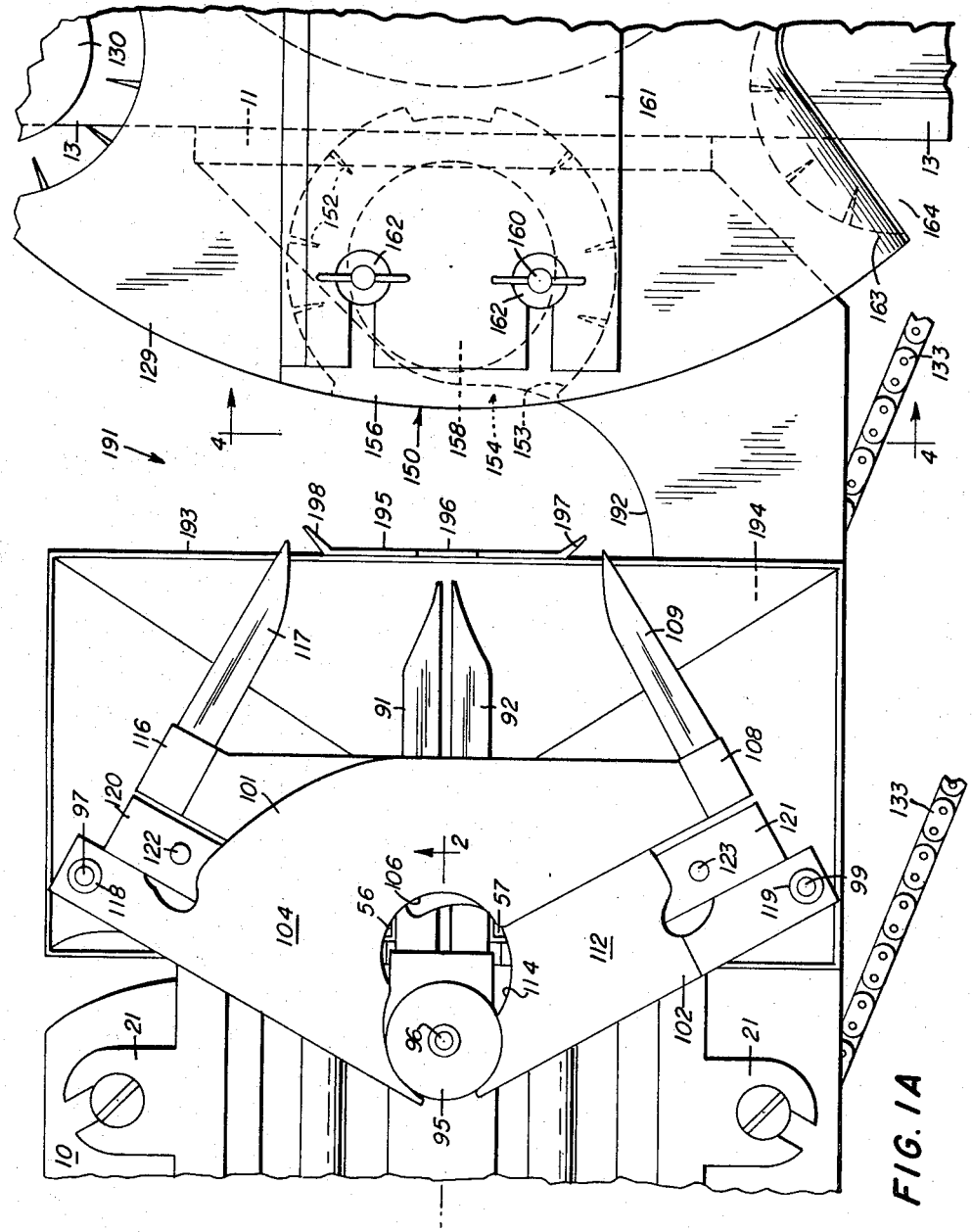
FIGS. 1A and 1B, show plan views of the forward and rear halves, respectively, of a machine in accordance with the invention attached to a portion of the crab coring apparatus for operative association therewith.
Figure 4:
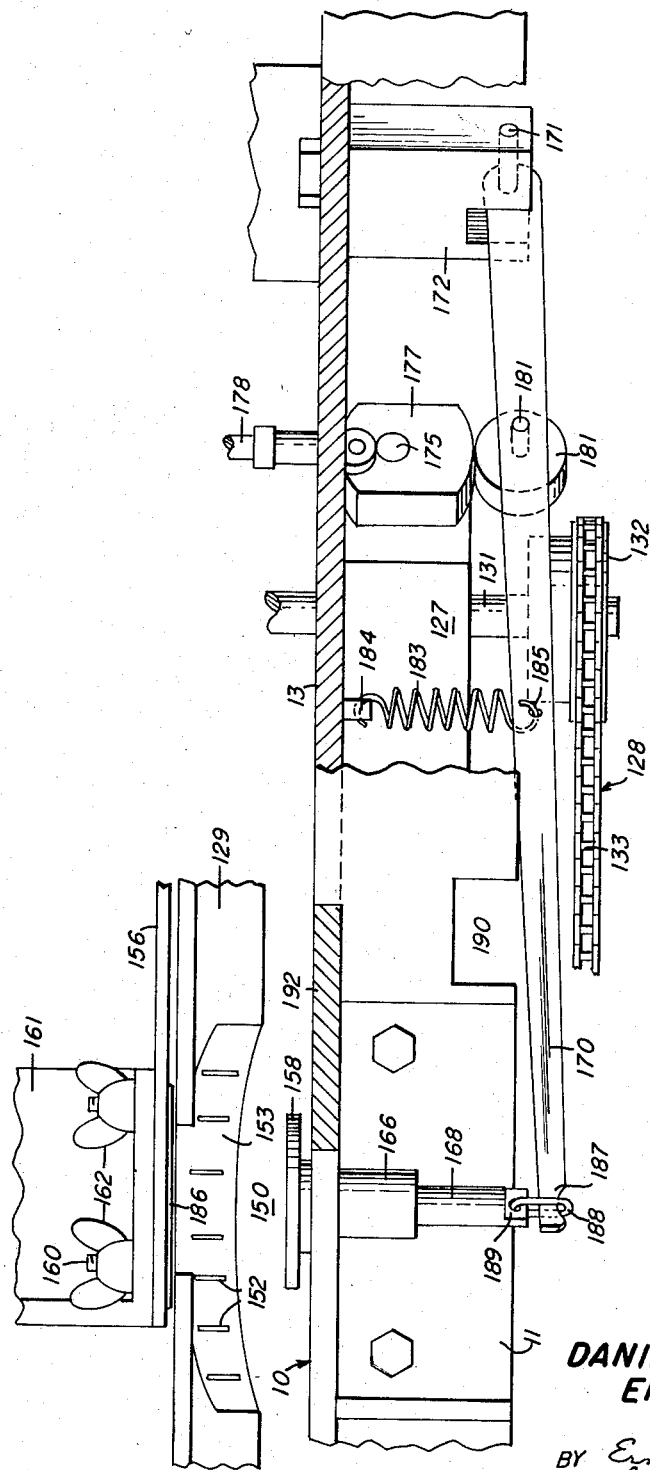

FIG. 3 is a fragmentary plan view of the machine in accordance with the invention illustrating particularly the structural arrangement of the machine half way through a crab meat picking cycle; and FIG. 4 is a fragmentary elevational view, including in part the view taken along line 4—4 in FIG. 1A, of the crab-coring apparatus showing in particular components of the present invention that are arranged on the apparatus and operatively associated therewith.

The embodiment of the invention as shown in the drawings is constituted by a plurality of structurally interrelated integral elements forming a compact mechanical assembly. The principal underlying support element of this assembly is an elongated plate 10 which is maintained steady in a level position by a flange 11 constituting in extended forward edge of the pate facilitating attachment thereof to a lower horizontal frame member 13 of the aforementioned crab coring apparatus, and a floor stand 15 on which the rear edge of plate 10 is firmly supported by attachment thereto in a conventional manner. Overlying the greater part of the upper surface of plate 10 is a further basal support 18 whereupon operative elements of the assembly are arranged to have predetermined lateral or pivotal displacements with respect to one another, in a manner to be hereinafter more fully explained. Support 18 is fastened to plate 10 by clamps 20 adapted to grip a generally circular rear edge of the support, and screw fastenings which are received in slotted lugs 21 protruding from the opposite sides of the support. A relatively short vertical extension 23 at the forward end of support 18, which can be seen best in FIGS. 2 and 3, has formed in its upper edge a central opening 24 between smaller openings 25 and 26 in that edge. Forming the rear of support 18 is a channel-like member 28 whose upper part constitutes a raised shelf 30 which extends forwardly from a vertically disposed rectangular segment 31 thereof.

Within the basic framework defined by the structure thus far described is coordinated the dynamic structure of the invention comprising generally inner and outer carrier mechanisms 38 and 40, which are slidably mounted on a pair of cylindrical bars 42 and 44. Pairs of holes in the upper section of extensions 23 and segment 31, respectively, are suitably aligned facing each other so as to accommodate end portions of bars 42 and 44 passing therethrough. The bars are thereby held symmetrically arranged in parallel alignment above support 18, in which disposition they are maintained by conventional spring lock nuts 45 snapped into annular grooves on the extended ends of the bars. Inner carrier mechanism 38 comprises a unitary member 46 formed as an elongated, square cross-section medial bar 47 having perpendicularly extended across its back a symmetrically disposed rectangular bar 49, and extended out of its mid-section rectangular cross-section arms 50 and 51, disposed parallel to and in alignment with end bar 49. Outer carrier mechanism 40 comprises a unitary member 54 which suggests a partitioned rectangular frame. The forward and rear parts of member 54 each have a central passage provided by spaces between arms 56 and 57 and arms 58 and 59, constituting the forward and rear parts, respectively. A third pair of spaced apart arms 60 and 61 provide a further central passage in member 54, a short distance forward of its mid-section, and in alignment with the forward and rear passages. Also constituting integral parts of member 54 are wing-like, forwardly angled extensions 62 and 64 of arms 56 and 57, respectively, which are best seen in FIG. 3. Bar 49, each of the arms 50 and 51 of member 46, and each of the arms 58 to 61, inclusive, of member 54, have an opening therethrough in which is fitted a flanged sleeve bearing 63. In operatively relating member 46 to member 54, medial bar 47 of member 46 is positioned so as to traverse the passages between the paired arms 56 to 61 of member 54, and axially align the bearing sleeve passages in its bar 49 and arms 50 and 51, with those in arms 58 to 61, inclusive, of member 54. As is evident from FIGS. 1 to 3, this disposition of parts facilitates the arrangement shown wherein cylindrical bars 42 and 44, by extending through each of the aforesaid bearing sleeve passages, support these parts so that arms 50 and 51 of member 46 are guided for axial displacements along the bars within member 54 and between its arms 58 and 59, and 60 and 61, and arms 58 and 59 of member 54 are guided for axial displacements along the support bar between bar 49 and arms 50 and 51 of member 46.

Further comprising inner carrier mechanism 38 is a cam operated coupling device 66 which functions intermittently to link member 46 to member 54 of outer carrier mechanism 40, such that the two members are caused to move together either forwardly or to the rear as required by the operation of the machine. A trip lever 68 of the device is pivotally supported on the shank of a screw 69 fastened in a bearing bracket 70 which is secured to the upper surface of medial bar 47, toward the rear thereof. Adjustably secured in a groove on the underside of lever 68 near the front end thereof, is a wedge shaped pusher block 72. The back end of lever 68 is formed as an upwardly disposed lateral ridge 73, having oppositely inclined front and rear faces 74 and 75, respectively. A stiff spring wire 77 is tensioned against the upper surface of lever 68, ahead of the lever's pivot in bracket 70, and held fast by being bent around pivot screw 69. The rearward extension of lever 68 is adapted to pass under a cylindrical cam roller 80 which is mounted to rotate on a rod 81 supported in a bearing bracket 82 attached to shelf 30 of channel 28. Slots in the mounting pad of bracket 82 facilitate its attachment with screws after the roller cam is appropriately positioned. Block 72 of the trip lever is controlled by the camming action of roller 80 upon ridge 73 to intermittently coact with a cross-block 85 affixed to member 54 of the outer carrier mechanism 40 by screws secured in opposite side bars of the member. Block 85 is provided with front and rear notches 87 and 88, respectively, in which block 72 drops upon completing fore and aft displacements across block 85 in an operation to be hereinafter more fully explained.

Characterizing the anterior part of inner carrier mechanism 38 is a pair of straight gouge-like blades 91 and 92 which extend forwardly, out of a connector block 93 locked in an appropriately sized slot in the front face of medial bar 47. Blades 91 and 92, which have generally semi-circular concavo-convex cross-sections, are received in closely fitting oppositely curved cuts in block 93. The blades are thus maintained back to back in close proximity whereby their gradual taper to the fore situates slightly rounded cutting edges thereof in alignment, spaced a small distance apart. In addition, a camming disk 95 is rotatably mounted on top of medial bar 47, a short distance behind blades 91 and 92. Disk 95 is supported on a washer and a conventional shoulder screw 96 to rotate freely in a horizontal plane.

Located in the forward end of outer carrier mechanism 40, securely fitted in extension arms 62 and 64 of its member 54, are short, upright pins 97 and 99, constituting bearings on which a pair of further blade mount structures 101 and 102, respectively, are maintained for pivotal displacements in a horizontal plane. Each blade mount comprises a cam component and fixture in which a blade is secured. As is evident from the showing in the drawing, the cam component of blade mount 101 is essentially a flat plate 104 whose perimetrical edge is specially contoured to furnish it with an extended, undulated cam following surface 106, and to allow the plate to have unobstructed pivotal movements within a predetermined area. At a point on mount 101, furthest from its pivot pin 97, is a bent down tab portion of plate 104 which provides a surface to which is fixed a blade holding block 108. Tightly secured in a suitable retaining slot of block 108 is a blade 109 which although slightly shorter than blades 91 and 92, conforms very closely to the pattern of the longer blades. Blade mount 102 is also mainly a flat plate 112, whose form effectively follows a reverse image of plate 104. Its cam following surface 114 extends inwardly and around in a curved path which closely mirrors cam following surface 106. Secured in a blade holding block 116 fixed to a bent down tab at the free end of plate 112, is a blade 117 formed like blade 109.

Suitable bearing sleeves 118 and 119 provided in holes through projecting portions of blade mounts 101 and 102, accommodate outer carrier pins 97 and 99 in a slip fit so as to facilitate placement and removal of the mounts. As best seen in FIG. 1, the blade mounts are placed such that plate 104 of blade mount 101 generally overlaps plate 112 of blade mount 102, and cam following surfaces 106 and 114 of the plates make contact with camming disk 95 of inner carrier mechanism 38. Referring to FIG. 2, it can be seen that disk 95 is sufficiently wide to maintain contact with both of the cam following surfaces. Outer carrier extensions 62 and 64 are equipped with bumper block attachments 120 and 121 which act to check rearward overswings of blade mounts 102 and 101, respectively, and pins 122 and 123 set into these blocks similarly function in respect to possible forward overswings of blade mounts 101 and 102, respectively. A tie-bar 125, shown in FIG. 2, passing under blades 91 and 92, is fastened beneath extensions 62 and 64, and the bumper blocks to reinforce the assembly at the working end of outer carirer mechanism 40.

Referring particularly to FIGS. 2 and 4, it can be seen that inner carrier mechanism 38 is operatively connected to a further mechanism in a housing 127 of the aforementioned crab corer apparatus. A driving force is transmitted to the inner carrier mechanism by way of this operative connection which comprises a sprocket drive 128 furnishing motive power to crank and connecting rod members arranged to function below the carrier mechanism. Frame member 13 of the corer apparatus appears in FIG. 4 as a platform to whose underside is attached housing 127 where in this housing corresponds to gear box 270 disclosed in the previously identified copending application on the crab corer apparatus. As explained in that application, the mechanism in the gear box receives a rotative drive from a main drive shaft in the apparatus which also supplies driving forces to the crab core transfer table and vertically reciprocating core knock-out disk of the apparatus, identified in FIGS. 1 and 4 herein as elements 129 and 130, respectively. The gearing in housing 127 thus supplies a power take-off for the aforesaid driving arrangement through a shaft 131 to which is fixed a sprocket wheel 132. This power is transmitted by way of a sprocket chain 133 to a sprocket wheel 135 fixed to a shaft 136 extending up through a journal hub 137 projecting below base plate 10 of the subject machine. On a stub portion of shaft 136 arranged to project above support 18, is securely attached the hub of a crank arm 139 which is adapted to reciprocate oscillatory member 140 constituting a connecting rod between inner carrier mechanism 38 and the actuating drive therefor. A shoulder screw 141 passing freely through a hole in rod member 140 and fastened in the end of crank arm 139 joins these components in a conventional articulated connection.

A small rectangular plate 143 is releasably held within an oversized slot 144 on the underside of medial bar 47 by a pair of screws 145 and 146 which reside in narrow slots 147 and 148, respectively, extending down through the middle of the medial bar. Undercuts in the upper sections of slots 147 and 148 provide shoulders upon which the heads of screws 145 and 146 tighten as these screws are fastened in plate 143 to securely position the plate in slot 144. A further shoulder screw 149, which slip fits in a hole through the extended end of connecting rod 140 and fastens within a central opening on the underside of plate 143, completes the power train driving the carrier mechanisms. It is evident that screws 145 and 146 are releasable to permit a shifting of carrier mechanism 38, and thus movement of its slot 144 forward or back relative to driver connection plate 143. Facilitated thereby are adjustments of the carrier mechanism wherein positional limits for its hereinafter described cyclic displacement with respect to a predetermined operating point on the corer apparatus are readily set and maintained.

Crabs are processed in the corer apparatus at a plurality of stations therein corresponding to areas around the apparatus to which the crabs are conveyed and whereat they are positioned, or maintained stationary for manipulation during fixed periods of time occurring at regular intervals during cyclic operation of the corer apparatus. The carrier mechanisms become operative in coordination with the cyclic functions of the corer apparatus such that the blades of these mechanisms act within the substance of a crab core brought to a station, designated 150 in FIGS. 1 and 4 herein, by the rotation of transfer table 129. Station 150 follows in sequence after those stations of the corer apparatus whereat the carapace and ventral shell of the crab core, and its viscera were removed in a manner made more fully apparent by the disclosure in the previously identified co-pending application on the corer apparatus. Therefore, any crab core positioned at station 150 to be processed by the shellfish meat picking machine described herein, is substantially clear of outer shell coverings. Thus, each crab core retained on knife edges 152 in a transfer table recess 153 at station 150, is conditioned to expose its lump, or "back-fin" meat in the peripheral opening 154 of recess 153.

Provisions made to prevent displacement of the crab core within or from recess 153 during a lump meat picking operation in accordance with the present invention, include an arcuate retainer plate 156 adapted to overlie recess 153, and a vertically displaceable retainer pad 158. A pair of threaded studs 160 on plate 156 are received in slots of a generally L-shaped bracket 161, and secured thereby by wing nuts 162. Bracket 161 is fixed to a vertical frame member of the corer apparatus so as to locate retainer plate 156 over recess 153, and an extended part 163 of the plate having a slight upwardly disposed lip to cover part of an adjacent transfer table recess 164. Pad 158 is periodically activated to contact the crab core from below whereby it complements the containing effect of retainer plate 156 acting on the crab core from above.

A hub-like bearing sleeve structure 166 fitted into a hole at a forwardly extended platform section of plate 10 so as to project thereunder, constitutes a guide for a push rod 168 to which pad 158 is fixed. Push rod 168 obtains a drive for a periodic, reciprocative motion thereof from a cam actuated lever arm 170 pivotally mounted on a pin 171 in a bracket 172 bolted to the underside of frame member 13, and dependent therefrom. Extending out of one side of housing 127, and operatively connected to the gearing therein is a driver shaft 175 to which is fixed a partly rounded block-like camming eccentric 177, which for the purposes of the present invention is used in place of wheel 275 disclosed in the previously identified application on the crab corer apparatus. It is therefore evident that rod 178 shown pivotally attached to cam 177 corresponds to crab core knockout mechanism connecting rod 277 of the aforesaid application. A follower wheel 180 rotatably mounted on a pin 181 fixed in a rearward section of lever 170, is disposed to contact the camming surface of eccentric 177. A tension coil spring 183 having its respective ends hooked in an eyelet block 184 fixed to the underside of frame member 13, and a hole 185 in lever 170, draws the lever upward to maintain positive contact between wheel 180 and eccentric 177. A reduced segment 187 of the forward end of lever 170 projects through a loop of a closed link 188 suspended from a hole in a reduced segment 189 of the lower end of rod 168.

As best seen in FIG. 1A, the forward end of base plate 10 is characterized by a relatively large gap 191 which is generally defined between the plate's forward platform adjacent from flange 11, and a necked down section 192 of the plate bridging the front end of the plate to its rearwardly extending platform section on which support 18 and the assembled carrier mechanisms are operatively disposed. A funnel-like pan 193 bolted to the outer vertical extension 23 of support 13, extends down through gap 191. At about the middle of an outer wall 194 of pan 193, there are fixed a pair of channel elements, arranged vertically in parallel, in which slide elements of a stripper plate 195 are held in a snug fit so as to retain the upper portion of the stripper plate above the upper rim of pan 193. A central opening 196 and bent-out ears 197 and 198 along the plate's upper portion are appropriately contoured to allow passage of blades 91 and 92 through opening 196, and blades 109 and 117 past ears 197 and 198, respectively, wherein the blades skim past the contoured edge portions of the stripper plate.

Figure 1B:
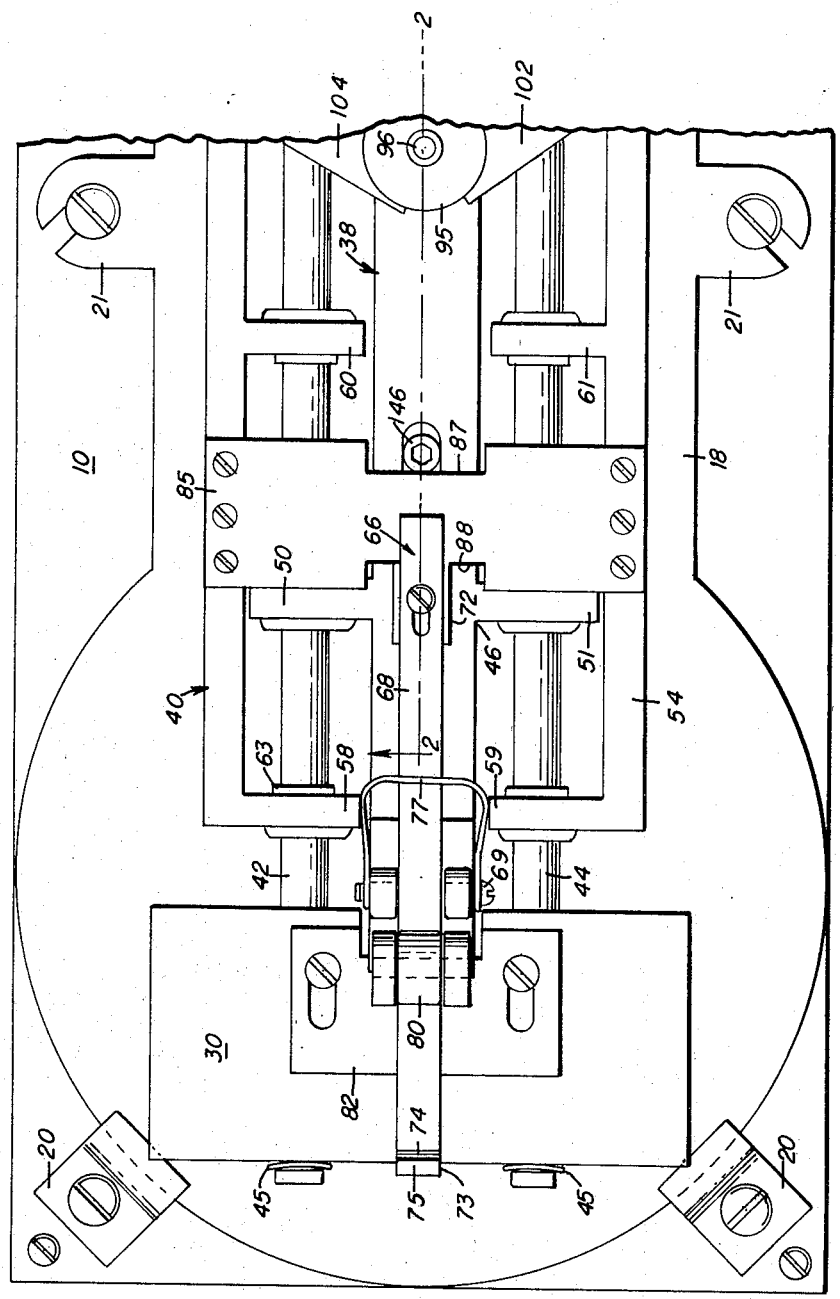

A requisite coordination between the crab meat picking machine heretofore described, and the crab coring apparatus, with which the machine is adapted to function, is accomplished by an initial adjustment of the blade carrier mechanisms 38 and 40 to their fully retracted positions, as seen in FIGS. 1A, 1B, and 2, when the recesses of transfer table 129 are at the mid-point of their travel between stations of the apparatus. The FIGS. 1 and 4 showing of the transfer table recesses as opposite the retracted carrier mechanisms, is merely illustrative of the structures involved and not a proper adjustment for the cooperation between these structures. In practice, the driving connection to the machine is completed by mounting sprocket chain 133 upon sprocket wheels 132 and 135 when the transfer table and carrier mechanisms are positioned as indicated for a proper coordination therebetween. Carrier mechanism 38 in retracted position locates trip lever 68 pivoted thereon so as to place the lever's block 72 at rear notch 88 of outer carrier mechanism cross-block 85 wherein the front end of block 72 is retained by the action of spring wire 77 upon lever 68. Contemporaneously therewith, unitary members 46 and 54 of the carrier mechanisms are located at their rearward limits and camming disk 95 resides in its rearmost position with respect to cam follower surfaces 106 and 114 on blade mount plates 104 and 112, respectively. Accordingly, block mounts 101 and 102 are withdrawn to rest adjacent bumper blocks 121 and 120, respectively, whereby gaps between the cutting edges of blades constituting blade sets 91 and 117, and 92 and 109 are at a maximum. At the same time retainer pad 158 is situated as shown in FIG. 4 wherein it is lowered out of the path taken by the transfer table recesses moving into station positions. In connection therewith lever arm 170 is maintained fully lowered against the tension of spring 183 by the action of eccentric 177 upon follower 180 which controls the lever arm.

With the approach of a transfer table recess to station 150 of the crab coring apparatus, sprocket drive 128 initiates an operational cycle of the crab lump meat picking machine by applying counterclockwise rotation to shaft 136 and crank 139 therewith as these elements would be seen from above. Connecting rod 140 responds to the crank arm impulse applied thereto at screw 141 by driving the articulated junction at screw 149 forwardly and by way of plate 143 connections in unitary member 46 displacing inner carrier mechanism 38 along therewith. Trip lever 68, being pivotally fixed to medial bar 47 of member 46, is also moved forwardly urging its block 72 against rear notch 88 in cross-block 85 on the outer carrier mechanism 40. As a result both carrier mechanisms 38 and 40 initially move together forwardly along slide bar supports 42 and 44. Blades 91 and 92 are shifted forwardly by their carrier mechanism and continue through opening 196 in stripper plate 195. Concurrently therewith blades 109 and 117 are conveyed forwardly with their mounts 101 and 102 by way of the latter's pivotal connections on pins 97 and 99, respectively, fixed in extension arms 62 and 64 of outer carrier mechanism 40. Outer, or side blades 109 and 117 are arranged to slip their cutting edges past ears 197 and 198 on stripper plate 195 without any appreciable displacement of these blades with respect to inner blades 91 and 92.

At a quarter turn of crank arm 139 the connecting rod drive has advanced inner carrier mechanism 38 and lever 68 thereon, sufficiently to bring inner face 74 on cam 73 into contact with cam roller 80 which is operative in bearing bracket 82 fixed to support shelf 30. As the ridge of cam 73 thereafter passes under roller 80, lever 68 pivots about screw 69 against the tension of spring wire 77, whereby block 73 is lifted out of notch 88. The inner carrier mechanism 38 is thus freed from its driving contact with outer carrier mechanism 40, and moves forward separately as its pusher block 72 rides over the top side of cross-block 85, and beyond. Outer carrier mechanism 40 having reached the limit of its forward motion is prevented from moving any further forward by a relatively wide ring clip 199 which, as shown in FIG. 3, rests on the forward end of slide bar 42 in front of the mechanism's arm 60.

With the outer carrier mechanism 40 and blade mounts 101 and 102, pivotally supported thereon, held in check, subsequent forward displacement of inner carrier mechanism 38 moves cam disk 95 further into the slot defined by cam following surfaces 106 and 114. Blade mounts 101 and 102 are affected only slightly by cam disk 95 until crank arm 139 has turned approximately 135° when the disk is sufficiently forward so as to contact the cam following surfaces at the inner end of the aforesaid slot formed thereby. Continued rotation of crank arm 139 to complete a half turn thereof brings disk 95 to its full forward position and perfects a drive therefrom which concurrently operated upon cam follower surface 106 to pivot blade mount plate 104 counterclockwise, as viewed in FIG. 1, about pin 97, and cam follower surface 114 to pivot blade mount plate 112 clockwise, as viewed in FIG. 1, about pin 99. Referring now to FIG. 3, where cam disk 95 is seen at a full forward position it will be evident that blade mount plates 104 and 112 have been angularly shifted to approximately their terminal forward positions and blades 109 and 117 fixed thereto, displaced accordingly. At the same time crank action on inner carrier mechanism 38 moved medial bar block 93 and blades 91 and 92 therewith to terminal forward positions. Thus the cutting edges of blades 117 and 109 moved arcuately to meet the linearly displaced cutting edges of blades 91 and 92, respectively, whereby each set of converging blades effectuated a unique cutting action. As these cutting sets of blades propel their cutting edges forwardly they are operable respectively in the two back-fin meat cavities of the crab core to sever the lumps of meat therein.

Shortly before crank 139 completes a full half turn, inner carrier mechanism 38 is moved sufficiently forward to place pusher block 72 beyond the inner edge of front notch 87 in cross-bar 85 whereby spring wire 77 pivots lever 68 down to carry the pusher block into the front notch of the cross-bar. Referring again to FIG. 3 where block 72 is shown in notch 87, it can be seen that inner carrier mechanism 38 is hooked to outer carrier mechanism 40 and made operative thereby to draw the outer carrier mechanism back therewith during rearward travel. During approximately the first 60 degrees rotation after the half turn position of crank 139, carrier mechanisms 38 and 40 move together rearwardly. Since there is no relative movement between the carrier mechanisms during concurrent movement thereof, disk cam 95 is inactive with respect to the cam following surfaces 106 and 114. Consequently, blade mounts 101 and 102 remain disposed as shown in FIG. 3, whereby the forward disposition of their blade sets remains unchanged. As the blades are borne rearwardly by their carrier structures the blade sets leave the crab core cavities and carry within each set of converged blades the severed lumps of back-fin meat.

As crank 139 rotates approximately ten degrees further towards completing a full turn, inner carrier mechanism 38 brings outer face 75 of camming element 73 into contact with roller cam 80 whereby pusher block 72 is lifted out of notch 87 on the front edge of cross-bar 85. Since the connection to the outer carrier mechanism 40 is thus undid, only inner carrier mechanism 38 is further retracted by crank arm 139 as the crank turns the remaining arc to complete a full cyclic rotation. Cam disk 95 being then enabled to move relative to the camming surfaces 106 and 114 acts thereon during approximately the last 30 degrees of the crank's rotation to pivot blade mounts 101 and 102 rearwardly and open the blade sets. The lumps of crab meat carried between the blades is thereupon released to the scraping action of stripper plate 195 which facilitates the disposal of the crab meat down in front of chute 193 on to a belt conveyor therebeneath. The blade carrier mechanisms subsequently assume their fully retracted dispositions when the front end of lever arm 68 is again urged down by spring wire 77 to place block 72 in the rear notch 88 of cross-bar 85 on the outer carrier mechanism.

In a manner well know in the art, coextensive drives from crab coring apparatus gear box 127 to eccentric cam 177, and to the crab lump meat picking machine via sprocket arrangement 128, facilitate the requisite cooperative relationship between the restraining action of retainer pad 158 and the crab meat picking functions of the blade sets of the machine. As was heretofore indicated, pad 158 is adapted to coact with retainer plate 156 to suitably secure a crab core in position for processing by the invention when the core is brought between these elements by transfer table 129 as the latter is periodically turned relative to the several stations of the crab coring apparatus by a drive coordinated with that applied to the gears in box 127, and consequently with the aforesaid coextensive drives therefrom. Therefore, eccentric 177 is operable to release follower wheel 180 and lever arm 170 controlled thereby to the action of coil spring 183 as a crab core is moved into station 150. Lever arm 170 moving upwardly into notch 190 of frame member 13, carries its segment 187 into driving contact with segment 189 at the end of push rod 168, and which is thus made to slide upward in bearing hub 166. Because of the relatively long low control surface on eccentric 177, pad 158 remains raised to press the crab core against gripping ridges 186 on the underside of fixed retainer plate 156 for a sufficient time to allow the extended lump picker blade sets to fully withdraw from the crab core as well as enter it to complete their cutting strokes. Retraction of retainer pad 158 is effectuated in an equally positive manner when eccentric 177 comes around to again apply its shorter high control surface against follower wheel 180 and cause lever 170 to pivot down and engage its segment 187 with link 188 so as to drive rod 168 and pad 158 therewith to a lowered position. In the normal operational sequence of the crab coring apparatus the picked crab core thus released by pad 158 is subsequently carried in the transfer table recess, as this table is moved around, to the next station where the core is brought under the core knockout mechanism of the apparatus so as to be removed therefrom during the following work interval of the apparatus.

The unique structural organization of the present invention readily admits a thorough cleaning and precise adjustments of its parts during any requisite maintenance thereof. Loosening clamps 20 and removal of the screw securing a lug 21, releases support 18 for turning on base 10 about the axis of shaft 136, whereby the blade structures and the parts adjacent thereto are set out in the open for easy cleaning and servicing. As was previously indicated, the blade structures are readily removed by urging mounts 101 and 102 up to slide them off their supporting pins 97 and 99. Slotted members such as lever 68, bracket 82, and bar 47, permit rapid adjustments of the displaceable parts of the invention to facilitate a precise coordination between the crab meat picking machine and the corer apparatus when they are assembled for operation.

Obviously other modifications and variations in the details of the present invention are possible in light of the disclosure herein. It is therefore understood that within the scope of the appended claims the invention may be practiced otherwise than as specifically described.

What is claimed is:

1. A shellfish core processing arrangement including an automatically activated shellfish meat severing and picking machine having linearly and angularly displaceable cutting and gripping devices comprising a plurality of blade sets which individually comprise a linearly displaceable blade and a linearly and angularly displaceable blade, and pivotally supported blade mount means having fixed thereto said linearly and angularly displaceable blade, an automatically operable shellfish core clamping mechanism, cyclically operable drive means, and drive transfer means operatively connecting said drive means to said automatically activated machine, and operable mechanism, respectively, whereby a coordinated cyclic operation is effectuated wherein a shellfish core held temporarily immobile in said mechanism is subject to severing and picking functions of said cutting and gripping devices, and reciprocative means operatively responsive to said drive transfer means to motivate said linearly displaceable blades and said blade mount means whereby said blade sets function together to sever shellfish meat and thereafter pick said severed shellfish meat from said shellfish core.

2. In said arrangement of claim 1, said automatically operable shellfish core clamping mechanism comprises a fixed element providing a first clamping surface, and a slidable element providing on one end thereof a second clamping surface facing said first clamping surface and adapted to press a shellfish core delivered between said surfaces on said first surface, means supporting said slidable element for reciprocative displacements, propelling means comprising a lever pivoted at one end thereof and flexibly connected at the translatable end thereof to said slidable element at an opposite end thereof, said propelling means further comprising a tensioned spring means fixed at one end and having the opposite end thereof connected centrally on said pivoted lever, continuously operable camming means having a first part rotatably mounted on said lever between said spring connection and the pivot point of said lever, and a second part fixed to an output shaft of said cyclically operable drive means, said spring and camming means being alternatively effective to control the displacement and position of said lever and the slidable element therewith whereby said second clamping surface is allowed to dwell spaced from said first clamping surface for a predetermined interval between alternate approaches and withdrawals of said second clamping surface from said first such surface during which said linearly and angularly displaceable cutting and gripping devices are displaced by said cyclically operatable drive means to effectuate said severing and picking functions thereof.

3. A shellfish core meat severing and picking machine comprising a base, a support structure releasably fastened to said base, elongated guide means disposed within said support structure and fixed thereto, first and second carriage members translatable on said guide means, a pair of blade sets wherein a blade of each set has one end thereof attached to said first carriage member, and another blade of each blade set has one end thereof attached to a separate blade mount element, bearing means on said second carriage member pivotally supporting said separate blade mount elements for substantially equal and opposite, limited angular displacements, a steadily operable drive means disposed to rotate in said support structure, reciprocating means adjustably connecting said drive means to said first carriage member to cyclically reciprocate said first carriage member along a linear path, a disengageable coupling means between said first and second carriage members, a coupling control means having a component of said coupling means fixed thereto, and cam following surfaces, a bracket pivotally supporting said coupling control means on said first carriage member, a first camming device fixed to said support structure to direct the operation of said coupling control means so as to intermittently allow said reciprocating drive to said first carriage member to be additionally effective upon said second carriage member, a second camming element attached to said first carriage member, and alike cam following surfaces on said blade mount elements, said surfaces being oppositely disposed to coact with said second camming element when said coupling means is rendered ineffective to impart a reciprocating drive to said second carriage member whereby said pivotally supported blades of said blade sets are angularly displaced while said blades on said sets which are attached to said first carriage member are linearly displaced therewith.

4. The machine of claim 3 wherein said first carriage member is translatable within said second carriage member, and said coupling control means comprises a spring loaded lever pivotally supported on said first carriage member, said lever having said control means coupling component fixed thereto on the underside thereof adjacent one end, and said cam following surfaces of said coupling control means disposed on an upper side thereof adjacent an opposite end, said coupling means further including a block having notches on opposite sides thereof and fixed across the upper part of said second carriage member whereby said notches are disposed spaced apart in the path traversed by said coupling component so as to receive said coupling component therein as it moves with said first carriage member when translating within said second carriage member.

5. The machine of claim 3 wherein each blade of said blade sets is an extended, straight element having a generally semicircular, concavo-convex cross-section which gradually reduces to shallower cross-sections adjacent the extended unattached end of said blade element to form a substantially half-round cutting edge across said extended end, said blade elements of each set which are attached to said blade mount elements being angularly disposed with respect to said blade elements of each set which are attached to said first carriage member, whereby linear and angular displacements of said angularly disposed blades and linear displacement of said blades attached to said first carriage member, alternately place the cutting edges of the blades of each set into close proximity to each other and a substantial distance apart.

6. The machine of claim 3 wherein said support structure is formed by a base and wall parts arranged upright at opposite ends of said base, one end wall part having a chute fastened thereto so as to dispose a wide opening of said chute under said blade sets, an upper edge of said chute furthest from said one end wall having fixed thereto means maintaining in operative position with respect to said blade sets a stripper plate which furnishes separate scraping surfaces to each of said blades of said sets.

7. The machine of claim 3 wherein a bearing hub is integrally formed with the underside of said base, and said steadily operatable drive means comprises a shaft rotatably supported in said hub, and a driving means cooperatively connected to one end of said shaft extending below said base and a driven crank member secured to another end of said shaft extending through said base and above said support structure, said reciprocating connecting means comprising a rod pivotally joined at one end thereof to the free end of said crank member and at the other end thereof to adjustable means releasably secured within the underside of said first carriage member.

8. The machine of claim 7 further comprising means for releasably fastening said support structure to said base whereby release of said support structure allows a turning thereof and the structure attached thereto about the axis of said shaft and with respect to said base.

References Cited
UNITED STATES PATENTS

| | | | |
|---|---|---|---|
| 1,982,779 | 12/1934 | Ayars | 146—52 |
| 3,249,962 | 5/1966 | Rossnan | 17—2 |
| 3,251,091 | 5/1966 | Altman | 17—2 |

LUCIE H. LAUDENSLAGER, *Primary Examiner.*